(12) United States Patent
van Veenendaal et al.

(10) Patent No.: US 8,810,607 B2
(45) Date of Patent: Aug. 19, 2014

(54) FLEXIBLE DISPLAY AND A METHOD OF MANUFACTURING A FLEXIBLE DISPLAY

(75) Inventors: Erik van Veenendaal, Eindhoven (NL); Nicolaas Aldegonda Jan Maria van Aerle, Eindhoven (NL); Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 825 days.

(21) Appl. No.: 12/674,380

(22) PCT Filed: Aug. 22, 2008

(86) PCT No.: PCT/NL2008/050560
§ 371 (c)(1),
(2), (4) Date: Jun. 24, 2010

(87) PCT Pub. No.: WO2009/025554
PCT Pub. Date: Feb. 26, 2009

(65) Prior Publication Data
US 2011/0109654 A1    May 12, 2011

Related U.S. Application Data

(60) Provisional application No. 60/957,357, filed on Aug. 22, 2007.

(51) Int. Cl.
*G09G 5/10* (2006.01)
*G02F 1/1333* (2006.01)
*G02F 1/1335* (2006.01)

(52) U.S. Cl.
CPC .... *G02F 1/133514* (2013.01); *G02F 1/133305* (2013.01)
USPC ............... 345/690; 345/83; 345/88; 345/92; 345/204; 345/205; 349/106; 349/109

(58) Field of Classification Search
CPC . G09G 3/2014; G09G 3/2022; G09G 3/2029; G09G 2320/0247; G09G 2320/0266
USPC ............... 345/83, 88, 92, 204–205, 690, 694; 349/106–109
See application file for complete search history.

(56) References Cited

U.S. PATENT DOCUMENTS 5,881,210 A * 3/1999 Guay et al. ..................... 358/1.9
6,124,909 A   9/2000 Miyashita et al.
(Continued)

FOREIGN PATENT DOCUMENTS

TW         I285278         8/2007
WO    WO 2007/063440 A    6/2007

OTHER PUBLICATIONS

International Search Report for PCT/NL2008/050560, dated Jan. 28, 2009.

(Continued)

*Primary Examiner* — Shaheda Abdin (57) ABSTRACT

The invention relates to a flexible display comprising a first flexible layer configured to comprise pixels 5 of the flexible display, a second flexible layer superposed on the first flexible layer, which second flexible layer comprises a color filter with a plurality of color elements 1, 2, 3, 4 associated with said pixels, wherein the pixels comprise color sub-pixels 1a, 2a, 3a, 4a, the color elements and/or color sub-pixels being discontinuously arranged to counteract misalignment between respective color sub-pixels and color elements. The color elements 1, 2, 3, 4 are arranged to substantially overlap respective sub-pixels 1a, 2a, 3a, 4a whereby the buffer zones 6a, 6b, 6c, 6d are arranged to overlap a portion of said sub-pixels as well. The invention further relates to a method of manufacturing a flexible display.

16 Claims, 4 Drawing Sheets

(56) References Cited

U.S. PATENT DOCUMENTS

| | | | |
|---|---|---|---|
| 6,680,761 B1* | 1/2004 | Greene et al. | 349/73 |
| 7,417,648 B2* | 8/2008 | Credelle | 345/694 |
| 2003/0160914 A1* | 8/2003 | Ha | 349/106 |
| 2004/0125290 A1* | 7/2004 | Nam et al. | 349/114 |
| 2005/0162061 A1* | 7/2005 | Bae et al. | 313/483 |
| 2006/0098154 A1 | 5/2006 | Kim et al. | |

OTHER PUBLICATIONS

Taiwan Patent Office, Office Action, Patent Application Serial No. 097132042, Jul. 25, 2013, Taiwan.

* cited by examiner

Fig. 3

FLEXIBLE DISPLAY AND A METHOD OF MANUFACTURING A FLEXIBLE DISPLAY

FIELD OF THE INVENTION

The invention relates to a flexible display.
The invention further relates to a method of manufacturing a flexible display.

BACKGROUND OF THE INVENTION

An embodiment of a flexible display is known from WO2007/063440. The known flexible display comprises a display effect layer, which may be arranged to reflect or to emit light with a broad spectrum (white), and a color filter layer, which is arranged to change the white light into colored light. The display effect layer and the color filter layer need to be properly aligned, for example to prevent parallax or aperture problems. When bending a flexible display, alignment problems between the display effect layer and the color filter layer can occur due to the different bending radii of these flexible layers. Alignment problems can also occur during manufacturing due to the dimensional accuracy and instability of the separately fabricated pixel matrix and color filter matrix. In addition, alignment problems occur during use when the color filter shifts with respect to the associated pixels leading to deterioration of the color quality of the flexible display.

In order to counteract alignment problems the known flexible display comprises a series of interconnected color stripes, said stripes being arranged to extend in a rolling or bending direction of the flexible display.

It is a disadvantage of the known flexible display in that the misalignment problems are not addressed to a sufficient extent. In particular, after substantial number of rolling or bending repetitions, the color stripes tend to shift from their original position leading to color mixing and a decrease of color purity.

SUMMARY OF THE INVENTION

It is an object of the invention to provide a flexible display wherein misalignment problems between the color filter and the pixel matrix are mitigated to a better extent.

To this end the flexible display according to the invention comprises:
a first flexible layer configured to comprise pixels of the flexible display;
a second flexible layer superposed on the first flexible layer, which second flexible layer comprises a color filter with a plurality of color elements associated with said pixels, wherein the pixels comprise color sub-pixels, the color elements and/or color sub-pixels being discontinuously arranged to counteract misalignment between respective color sub-pixels and color elements.

It is found that by providing a discontinuous color filter, i.e. a filter comprising individual color-coded regions being not in contact with other color-coded regions, a substantial improvement of misalignment mitigation is achieved. Preferably, the flexible display is arranged with buffer zones adjacent to said color elements. Such buffer zones may comprise respective regions of a white material. It is noted that the term 'white' is defined as being substantially transparent, i.e. at least 70% transparent to the white light. The term 'white' may also relate to achromatic or non-colored regions. However, other implementations, like a colored region, of the buffer zones are possible. It is found that by providing a discontinuous color filter misalignment of the color filter in the fabrication process due to, for example, imperfect registration, small dimensional instabilities, etc. is counteracted. In addition, misalignment of the color filter with respect to the pixel matrix due to, for example, a certain non-zero relative creep in the pixel layer and in the filter layer accumulated in use is counteracted as well. Exemplary embodiments will be described in more detail with reference to FIG. 1 and FIG. 2.

In an embodiment of the flexible display according to the invention the pixels are arranged in lines, each line has an associated color, the color elements being arranged in stripes having respective colors which extend substantially along said lines, the buffer zones being arranged between respective stripes. Preferably, the color stripes are arranged in a rolling or bending direction of the flexible display. Due to the fact that the color stripes are separated from each other, such filter is tolerant to misalignments in a transverse direction because the buffer zone, even when superposed on a pixel line of different color, does not introduce any parasitic color interference between a displaced color stripe and an adjacent pixel line of a not associated color. When the buffer zone is arranged as a white region, a sub-pixel having a superposed displaced color filter will substantially have a correct amount of color and some white in addition, whereby optical performance of such flexible display remains unchanged. Further details of this embodiment are discussed with reference to FIG. 1.

In a further embodiment of the flexible display according to the invention a pixel comprises a plurality of sub-pixels, each sub-pixel being color-coded and having a respective area, the color filter comprising a plurality of color elements associated with said sub-pixels, adjacent color elements being separated by the buffer zone. Embodiments discussed with reference to FIGS. 1, 2 have a particular advantage. Characteristics of the color filter are usually achieved by processing a suitable color resist of a certain thickness containing a certain concentration of pigments or dyes or a combination of pigments and dyes. This color filter design offers an opportunity to adjust the color points to a desired extent without changing processing conditions, like resist thickness and color pigment and/or dye concentration. This may be achieved by changing respective dimensions of the buffer zones, color elements. Such flexibility of the processing conditions is advantageous, as specific requirements may be met by simply altering a mask, other processing conditions being kept unchanged. The sub-pixels may be arranged according to a configuration selected from a group of a rectangular matrix, a delta-nabla matrix, a PenTile Matrix™ (developed by ClairVoyante Laboratories, as described for example by C. H. Brown Elliott, T. L. Credelle, S. Han, M. H. Im, M. F. Higgins & P. Higgins, "Development of the PenTile Matrix™. Color AMLCD Subpixel Architecture and Rendering Algorithms", SID 2003, Journal Article), a matrix with variable sub-pixel size and/or sub-pixel intensity, a matrix with a non-rectangular design or a combination thereof.

A method according to the invention comprises the following steps:
forming a first flexible layer configured to comprise pixels with sub-pixels of the flexible display;
forming a second flexible layer superposed on the first flexible layer, which second flexible layer comprises a color filter with a plurality of color elements corresponding with the sub-pixels,
providing buffer zones adjacent to said color elements and/or adjacent to said color sub-pixels, said buffer zones being constructed to counteract misalignment between respective color sub-pixels and color elements.

Preferably, absolute dimensions of the color elements are adjustable. In particular, absolute dimensions of the color elements may be adjusted pursuant to a suitable optimization step of a color output for pixels of a specific configuration. For example, individual specific absolute dimensions of the color elements may be selected for different flexible displays having different respective pixels configurations.

These and other aspects of the invention will be discussed in further details with reference to drawings, wherein like reference signs denote like elements of the flexible display. It is noted that specific elements discussed with reference to different figures may be combined or interchanged, the figures serving for illustration purposes only and may not be used for limiting the scope.

BRIEF DESCRIPTION

DETAILED DESCRIPTION

Figure 1:
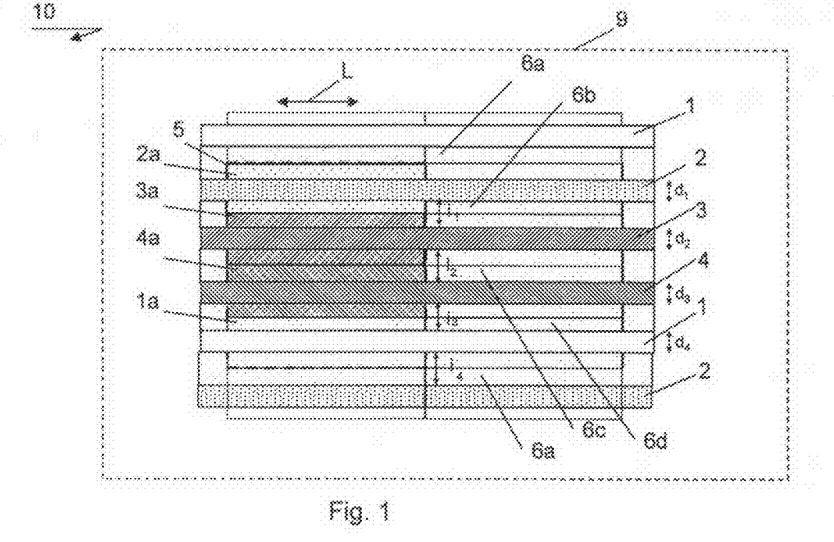
FIG. 1 presents a schematic view of an embodiment of a flexible display according to the invention, provided with a discontinuous color filter.

FIG. 1 presents a schematic view of an embodiment of a flexible display according to the invention, provided with a discontinuous color filter. The color filter comprises regions 1, 2, 3, 4 arranged to function as color elements. For example region 1 may be arranged as red color filter, region 2 may be arranged as green color filter, region 3 may be arranged as blue color filter. It is noted that although color filter according to the present embodiment comprises white region 4, the white region may be omitted resulting in alternating red-green-blue color elements. An example of the white region is a substantially non-colored transparent region. Each region 1, 2, 3, 4 may be arranged to have its individual width $d_1$, $d_2$, $d_3$, $d_4$, respectively. In a preferred embodiment, all regions have the same width, which simplifies production process.

The color filter according to the invention may be provided as individually formed regions 1, 2, 3, 4. Preferably, these regions are arranged substantially along a rolling or bending direction L of the flexible display. It may, however, be advantageous to provide the color filter wherein the regions 1, 2, 3, 4 are connected together by means of buffer zones 6a, 6b, 6c, 6d, respectively. The buffer zones are preferably arranged to function as white or achromatic or non-colored regions, being at least 70% transparent to the visible light. Alternatively, in particular when the color elements 1, 2, 3, 4 are of a different color than red green, blue and white, the buffer zones 6a, 6b, 6c, 6d may be arranged as respective colored regions.

In FIG. 1 the color filter according to the invention is illustrated in superposition on a pixel 5 of the display screen 9. An active area of the display 9 is provided by a suitable repetition of the pixel 5 in a length direction L and in a width direction W of the display 9. It is shown that the pixel 5 may comprise sub-pixels 1a, 2a, 3a, 4a, whereby the color elements 1, 2, 3, 4 are associated with said sub-pixels. In this embodiment the sub-pixels are substantially rectangular in shape. Preferably, the sub-pixels are controlled to produce light or to reflect light with a wavelength substantially matching the color of the color element said sub-pixel is associated with. For example, in case regions 1, 2, 3, 4 correspond to red-green-blue-white sequence, the sub-pixels 1a, 2a, 3a, 4a are controlled to provide red-green-blue-white light, respectively.

The color elements 1, 2, 3, 4 are arranged to substantially overlap respective sub-pixels 1a, 2a, 3a, 4a whereby the buffer zones 6a, 6b, 6c, 6d are arranged to overlap a portion of said sub-pixels as well. The width of buffer zone of sub-pixel 1a is split into $i_{1a}$ and $i_{1b}$; of sub-pixel 2a is split into $i_{2a}$ and $i_{2b}$; of sub-pixel 3a is split into $i_{3a}$ and $i_{3b}$; of sub-pixel 4a is split into $i_{4a}$ and $i_{4b}$. Hence the total width of sub-pixel 1a amounts $i_{1a}+d_1+i_{1b}$; of sub-pixel 2a amounts $i_{2a}+d_2+i_{2b}$; of sub-pixel 3a amounts $i_{3a}+d_3+i_{3b}$; of sub-pixel 4a amounts $i_{4a}+d_4+i_{4b}$. Preferably, a width of a buffer zone is about 10-50% of a width of a color element. Due to the fact that the buffer zone is formed from a first region overlapping a first sub-pixel, said first region being adjacent to a second region overlapping a second sub-pixel, a dimension of the first region and/or the second region in a direction of possible displacement are selected to be at least equal to a value of misalignment conceived to be counteracted in that direction. Such value may be established from practical observations on the performance of the flexible display with time.

In practice the centre of each color element is preferentially centered with respect to the respective sub-pixel areas. As a result, due to the presence of the buffer zones, a sub-pixel will not be experiencing any parasitic interference with a not-associated color element in case the discontinuous color filter 10 is misaligned up to 5-25% of the width of a color element with respect to the pixel 5, provided the misalignment is less or equal to the smallest value of $i_{1a}$, $i_{1b}$, $i_{2a}$, $i_{2b}$, $i_{3a}$, $i_{3b}$, $i_{4a}$, $i_{4b}$ and the color of the buffer layer differs from the color of the color regions 1,2,3,4 within the same sub-pixel. If the color of the buffer layer and of the color element within a sub-pixel 'z' are the same, the respective buffer layer width values $i_{z'a}$, $i_{z'b}$ do not contribute to aforementioned misalignment definition. It is found that maximal misalignment may be about 5 micrometer. Preferably, the width of the buffer zone is at least 10 micrometer.

Figure 2:
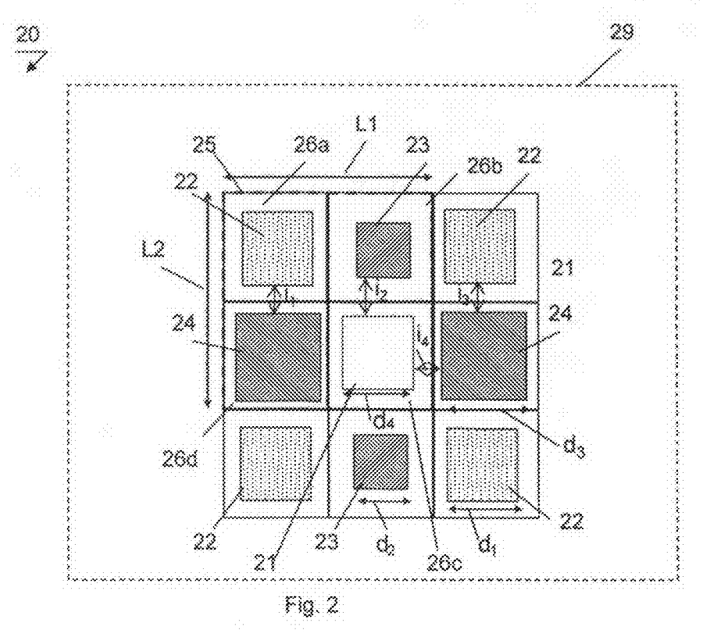
FIG. 2 provides a schematic view of a further embodiment of a flexible display according to the invention, provided with a discontinuous color filter.

FIG. 2 provides a schematic view of a further embodiment of a flexible display 29 according to the invention, provided with a discontinuous color filter. A discontinuous color filter 20 comprises color elements 21, 22, 23, 24, which are preferably centered with respect to sub-pixels (not shown) of a pixel 25. An active area of the display 29 is provided by a suitable repetition of the pixel 25 in a length direction L1 and in a width direction L2. The sub-pixels 21, 22, 23, 24 may be substantially square-shaped. In this particular example the color elements 21, 22, 23, 24, relate to red, green, blue, white, respectively. Use of a red-green-blue discontinuous color filter is contemplated as well. It is noted that the display may be provided with any other pixel configuration, for example related to a different arrangement of sub-pixels and/or different colors of the sub-pixels. For example, a PenTile Matrix™ (developed by ClairVoyante Laboratories, as described for example by C. H. Brown Elliott, T. L. Credelle, S. Han, M. H. Im, M. F. Higgins & P. Higgins, "Development of the PenTile Matrix™. Color AMLCD Subpixel Architecture and Rendering Algorithms", SID 2003, Journal Article), a matrix with variable sub-pixel size and/or variable transmission, a matrix with a non-rectangular design or a combination thereof. It is found advantageous to adjust a color gamut of the display by changing original transmission values and profiles of individual sub-pixels (like Red, Green, Blue) into adjusted transmission values, like light-red, light-green, or light-blue (i.e., less saturated colors). It is noted that such adjustment may be required also in a direction of darker shades (i.e., more saturated colors) for some sub-pixel colors, any of which is optimized for enabling an optimum white sub-pixel of the color gamut. An example of such adjustment strategy is described in Roth et al "4.5: Multi-primary LCD for TV Applications", SID 07 Digest, pp 34-37.

In this example the color elements 21, 22, 23, 24 are provided with different individual dimensions d1$x$, d2$x$, d3$x$, d4$x$ in x-direction and d1$y$, d2$y$, d3$y$, d4$y$ in y-direction. Alternatively, the color elements 21, 22, 23, 24 may be formed to have the same dimension. The buffer zones 26$a$, 26$b$, 26$c$, 26$d$ are arranged as for example white or non-colored transparent areas and are dimensioned to surround respective color elements of the discontinuous color filter. Due to the fact that the color elements may have individual dimensions, a size of the buffer zone between respective color elements in a row (or in a column) $i_1$, $i_2$, $i_3$, $i_4$ may be different. In this example one sub-pixel comprises color element 21 and bufferzone 26$a$, with respective dimensions d1$x$, d1$y$ for the color element 21 and $i_{1x\text{-}a}$, $i_{1x\text{-}b}$, of the buffer zone 26$a$ in the L1 direction and $i_{1y\text{-}a}$, $i_{1y\text{-}b}$ of the buffer zone 26$a$ in the L2 direction. Another sub-pixel comprises a color element 22 and bufferzone 26$b$, with respective dimensions d2$x$, d2$y$ for the color element 21 and $i_{2x\text{-}a}$, $i_{2x\text{-}b}$, of the buffer zone 26$b$ in the L1 direction and $i_{2y\text{-}a}$, $i_{2y\text{-}b}$ of the buffer zone 26$b$ in the L2 direction. Another sub-pixel comprises a color element 23 and bufferzone 26$c$, with respective dimensions d3$x$, d3$y$ for the color element 23 and $i_{3x\text{-}a}$, $i_{3x\text{-}b}$ of the buffer zone 26$c$ in the L1 direction and $i_{3y\text{-}a}$, $i_{3y\text{-}b}$ of the buffer zone 26$c$ in the L2 direction. The fourth sub-pixel comprises a color element 24 and bufferzone 26$d$, with respective dimensions d4$x$, d4$y$ for the color element 24 and $i_{4x\text{-}a}$, $i_{4x\text{-}b}$, of the buffer zone 26$d$ in the L1 direction and $i_{4y\text{-}a}$, $i_{4y\text{-}b}$ of the buffer zone 26$d$ in the L2 direction.

Also in this embodiment of the color filter 20 a possible misalignment between the color elements 21, 22, 23, 24 and respective sub-pixels of the pixel 25 does not lead to a parasitic interference between a neighboring color element and a sub-pixel not associated with said neighboring color element, provided the maximum shift in L1 direction is smaller than the smallest value of $i_{1x\text{-}a}$, $i_{1x\text{-}b}$, $i_{2x\text{-}a}$, $i_{2x\text{-}b}$, $i_{3x\text{-}a}$, $i_{3x\text{-}b}$, $i_{4x\text{-}a}$, $i_{4x\text{-}b}$; and the maximum shift in L2 direction is smaller than the smallest value of $i_{1y\text{-}a}$, $i_{1y\text{-}b}$, $i_{2y\text{-}a}$, $i_{2y\text{-}b}$, $i_{3y\text{-}a}$, $i_{3y\text{-}b}$, $i_{4y\text{-}a}$, $i_{4y\text{-}b}$. In case the color element is of the same color as the buffer zones, the respective $i_{zx\text{-}a}$, $i_{zx\text{-}b}$, $i_{zy\text{-}a}$, $i_{zy\text{-}b}$ are not limiting in the maximum acceptable misalignment.

The embodiment of the discontinuous color filter of FIG. 2 has additional advantages. It is acknowledged in the art that characteristics of the color filter are achieved by processing a suitable color resist of a certain thickness containing a certain concentration of pigments and/or dyes. The color filter design of FIG. 2 offers an opportunity to adjust the color points to a desired extent without changing processing conditions, like resist thickness and color pigment concentration. This may be achieved by changing respective dimensions of the buffer zones and/or color elements. Such flexibility of the processing conditions is advantageous, as specific requirements may be met by simply altering a mask, other processing conditions being kept unchanged.

Figure 3:
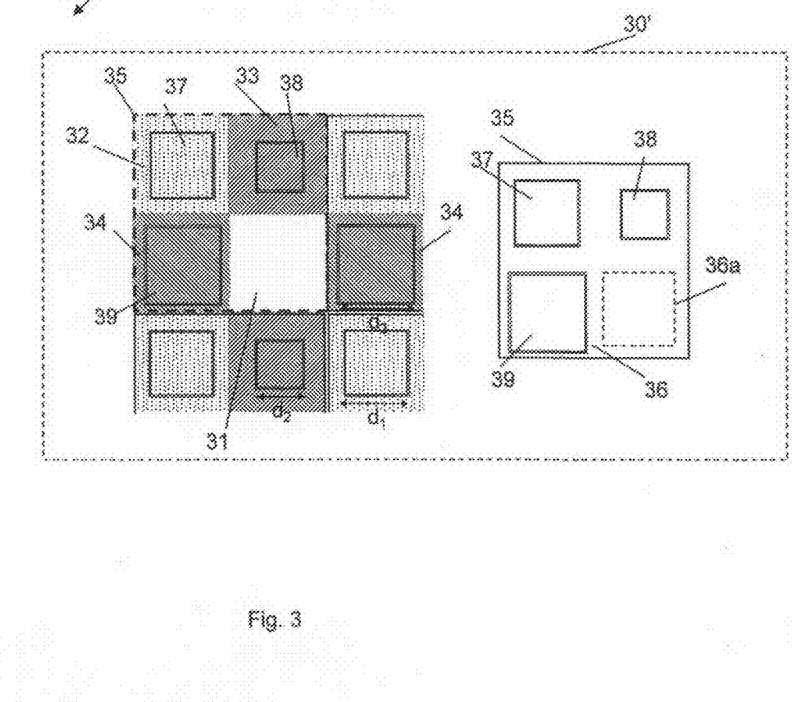
FIG. 3 provides a schematic view of a still further embodiment of a flexible display according to the invention, provided with a continuous color filter cooperating with discontinuous sub-pixels.

FIG. 3 provides a schematic view of an alternative design of a flexible display 30 according to the invention. The flexible display 30 comprises a flexible layer 30' configured to comprise pixel 35 of the flexible display. The display is formed by a suitable repetition of the pixel 35 along a length and a width direction (not shown). Alternatively, a delta-nabla or another suitable configuration may be used. The flexible display is provided with a continuous color filter, wherein electrodes 37, 38, 39 are constructed to provide a certain colored light output, like red, green, blue, respectively. The electrodes 37, 38, 39 may be arranged to occupy respective portions of the pixel area 35, whereby said portions are separated by a buffer zone 36, which may or may not be combined with an area 36$a$ corresponding to a white sub-pixel. It is noted that the area 36, including 36$a$ may be mutually controlled. This can result in a mixing of red, green, blue and white. It is noted that in case the pixel 35 is not conceived to comprise a white sub-pixel, the area 36$a$ may be occupied by a suitably dimensioned electrode of the type 37, 38 or 39.

As a result, possible misalignment between the color elements 32, 33, 39, 31 and the sub-pixels 37, 38, 39, 36$a$ is counteracted due to the fact that the electrodes 37, 28, 39, 36$a$ occupy a smaller area than respective associated color elements 32, 33, 34, 31.

Although FIG. 3 illustrates a square-shaped pixel 35 and substantially square-shaped individual color elements 31, 32, 33, 34, use of rectangular pixels provided with rectangular sub-pixels in combination with a color filter comprising respective stripes of color elements is contemplated as well. Additionally, delta-nabla configuration is contemplated, wherein respective color-sub-pixels are separated by the buffer zone. Preferably, the buffer zone is integrated and is controlled by a single electrode. In case when the delta-nabla configuration comprises white sub-pixels, the buffer zone may be integrated with said white sub-pixels. This feature substantially reduces absolute number of controllable electrodes.

Figure 4:
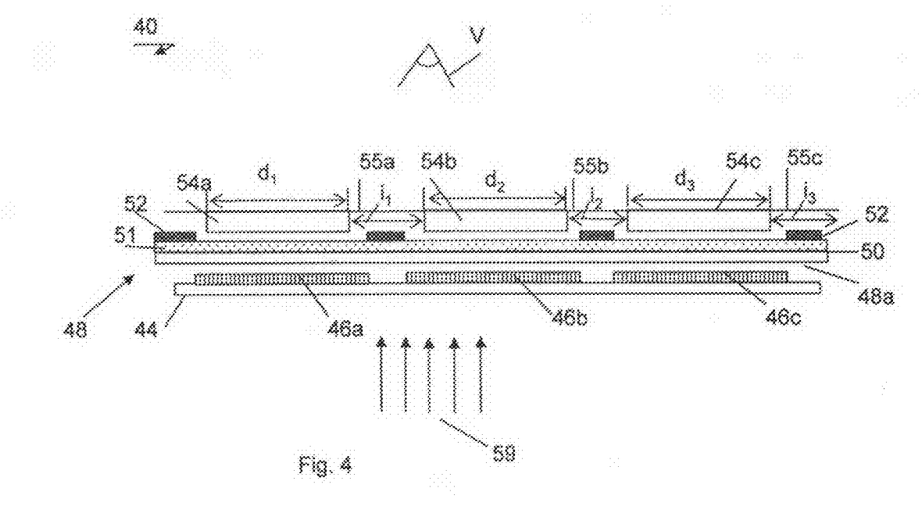
FIG. 4 provides a schematic view of an embodiment of an electronic device according to the invention.

FIG. 4 provides a schematic view of an embodiment of an electronic device 40 according to the invention. A display effect layer 48 may comprise materials for the transmission and/or reflection of light. In this embodiment, the display effect layer 48 may include liquid crystal, electrophoretic capsules or any other emitting, transmitting or reflecting material for guiding light to a viewer V. A backplane substrate 44 may include a flexible polymer material on which sub-pixels 46$a$, 46$b$, 46$c$ and other electronic components may be formed. These electronic components may include transistors (thin film transistors, TFTs), capacitors, conductive lines, etc. For simplicity only sub-pixels 46$a$, 46$b$, 46$c$ are shown. Each sub-pixel 46$a$, 46$b$, 46$c$ may comprise a color element and buffer zone (not shown), discussed with reference to the foregoing. For a back lit embodiment, light 59 is passed through substrate 44 or other back end device to provide light through sub-pixels 46$a$, 46$b$, 46$c$. Other embodiments may include reflective displays where light is reflected from sub-pixels 46$a$, 46$b$, 46$c$ from the viewing side of the sub-pixels 46$a$, 46$b$, 46$c$. Still alternatively, a transflective embodiment may be used when a reflective element is positioned inside a transmissive element. A cell gap 48$a$ may be filled with liquid crystal, electrowetting capsules, or other display effect material which is responsive to sub-pixels 46$a$, 46$b$, 46$c$. For example, when activated, the sub-pixels 46$a$, 46$b$, 46$c$ may cause re-orientation of the liquid crystal molecules or a change in the electrowetting capsules as is known in the art. A substrate 51 may include a common electrode 50 formed thereon. The common electrode 50 cooperates with the sub-pixels 46$a$, 46$b$, 46$c$ to re-orient the adjacent liquid crystal material or to adjust the electrowetting material to an appropriate state.

In another embodiment of the flexible display according to the invention a black matrix 52 may be formed on substrate 51 or between substrate 51 and common electrode 50. Black matrix 52 is arranged to block out stray light to remove fuzziness from viewed displayed images and to eliminate light leakage in transmissive or reflective type of display in the non-switching areas between sub-pixels. Black matrix 52 also forms apertures for pixel light to pass through. The apertures (i.e. spaces between portions of black matrix 52) are aligned to the sub-pixels 46a, 46b, 46c and may be formed using a photolithography process/patterning.

Advantageously, a color filter comprising discontinuous color elements 54a, 54b, 54c as is discussed with reference to FIG. 1 or FIG. 2 is formed on the substrate 51 (and possible on black matrix). By arranging the color filter with isolated color elements possible displacement between respective color elements 54a, 54b, 54c with associated sub-pixels 46a, 46b, and 46c is counteracted. This is achieved due to the presence of buffer zones i1, i2, i3 between the color elements, as is discussed with respect to the foregoing. Such displacement may be a result of a relative creep between the pixel layer and the color filter layer. The color elements 54a, 54b, 54c may be formed to have individual dimensions $d_1$, $d_2$, $d_3$, for example depending on a color of the color element $d_1$, $d_2$, $d_3$.

Preferably, flexible, for example rollable displays comprise substrates 44, 51 used in both backplane and front plane are thin to enable the display to fold or to roll-up. The color filter having filter elements 54a, 54b, 54c is preferably formed on the front plane surface and due to thin substrate without parallax problems. The color filter may be formed in a plurality of steps. The color filter preferably includes materials capable of filtering out all components of light except for a given wavelength range. The color filter may includes a red (R) portion 54a, a green (G) portion 54b and a blue (B) portion 54c. Alternatively, the color filter may comprise a white (W) portion. The RGB or RGBW may be formed separately in the same layer level. In case of a transmissive display, sub-pixels 46a, 46b, 46c transmit white light 59 which is filtered by color filter to permit the appropriate color (Red, Green or Blue) to transmit therefrom. Usually, three sub-pixels 46a, 46b, 46c are used to form a single pixel image for the viewer V. It is noted that the color filter comprising color elements 54a, 54b, 54c may be combined with a scratch protection layer, a humidity barrier or other films or functional layers. The electronic device 40 may related to a mobile phone, organizer, palmtop computer, or the like.

While specific embodiments of the invention have been described above, it will be appreciated that the invention may be practiced otherwise than as described. In addition, isolated features discussed with reference to different figures may be combined.

The invention claimed is:

1. A flexible display comprising:
   a first flexible layer configured to comprise pixels of the flexible display; and
   a second flexible layer superposed on the first flexible layer, the second flexible layer comprising a color filter having a plurality of color elements associated with said pixels of the flexible display,
   wherein the pixels of the flexible display each comprise color sub-pixels, the color elements being discontinuously arranged to respectively overlap a corresponding sup-pixel, wherein each of the color sub-pixels comprises an emission region through which light is passed through;
   wherein the flexible display is arranged with buffer zones adjacent to said color elements so as to separate the color elements, arranged such that the buffer zones respectively overlap the emission region of the sub-pixel corresponding to the color element to which they are adjacent to counteract misalignment between respective color sub-pixels and color elements, and
   wherein the buffer zones comprise regions of white or transparent non-colored material.

2. The flexible display according to claim 1, wherein the sub-pixels are arranged in lines, each line having an associated color, the color elements being arranged in stripes having respective colors which extend substantially along said lines, the buffer zones being arranged between respective stripes.

3. The flexible display according to claim 2, wherein the buffer zone is formed from a first region overlapping a first sub-pixel, said first region being adjacent to a second region overlapping a second sub-pixel, a dimension of the first region and/or the second region in a direction of displacement being at least equal to a value of misalignment conceived to be counteracted.

4. The flexible display according to claim 1, wherein each sub-pixel is color-coded and has a respective area, the color filter comprising a plurality of color elements associated with said sub-pixels, adjacent color elements being separated by the buffer zone.

5. The flexible display according to claim 4, wherein the sub-pixels are arranged according to a configuration selected from the group consisting of
   a rectangular matrix,
   a delta-nabla matrix,
   a matrix with variable sub-pixel size and/or variable transmission, and
   any combination of the listed group of configurations.

6. The flexible display according to claim 1, wherein the buffer zones form part of the color filter.

7. The flexible display according to claim 1, wherein the buffer zones share a same electrode.

8. The flexible display according to claim 1, wherein the buffer zones comprises regions of white material.

9. The flexible display according to claim 1, wherein the pixels of the flexible display each further comprises a white sub-pixel, and the white sub-pixel being integrated with an adjacent one of the buffer zones.

10. An electronic device comprising a flexible display according to claim 1.

11. The flexible display according to claim 1, wherein the buffer zones have at least 70% transparent to the visible light.

12. The flexible display according to claim 1, wherein the color elements are arranged in a plane, and a projection area of each buffer zone in a direction perpendicular to the plane overlaps the emission region of the sub-pixel corresponding to the color element to which it is adjacent.

13. A method of manufacturing a flexible display, the method comprising the steps of:
   forming a first flexible layer configured to comprise pixels with color sub-pixels of the flexible display;
   forming a second flexible layer superposed on the first flexible layer, the second flexible layer comprising a color filter with a plurality of color elements corresponding with the sub-pixels, the color elements being discontinuously arranged to respectively overlap a corresponding sup-pixel; and
   providing buffer zones adjacent to said color elements so as to separate the color elements, arranged such that the buffer zones respectively overlap the emission region of the sub-pixel corresponding to the color element to which they are adjacent, said buffer zones being constructed to counteract misalignment between respective color sub-pixels and color elements of the flexible display,
   wherein the buffer zones comprise regions of white or transparent non-colored material.

14. The method according to claim 13, wherein absolute dimensions of the color elements are adjustable.

15. The method according to claim 13, wherein the buffer zones have at least 70% transparent to the visible light.

16. The method according to claim 13, wherein the color elements are arranged in a plane, and a projection area of each buffer zone in a direction perpendicular to the plane overlaps the emission region of the sub-pixel corresponding to the color element to which it is adjacent.

* * * * *